United States Patent [19]
Albert

[11] 3,771,368
[45] Nov. 13, 1973

[54] MULTI-OUTPUT INTEGRATING ACCELEROMETER

[75] Inventor: William C. Albert, Boonton, N.J.

[73] Assignee: The Singer Company, Little Falls, N.J.

[22] Filed: Feb. 22, 1971

[21] Appl. No.: 117,592

[52] U.S. Cl. .................................. 73/503, 73/515
[51] Int. Cl. ............................................. G01p 7/00
[58] Field of Search.................... 73/503, 510, 514, 73/492, 515, 516 R, 517 R; 200/61.45

[56] References Cited
UNITED STATES PATENTS
| | | | |
|---|---|---|---|
| 2,455,356 | 12/1948 | Crede | 73/492 X |
| 3,389,606 | 6/1968 | Watson | 73/492 |
| 2,311,637 | 2/1943 | Buchanan | 73/517 R X |
| 3,239,620 | 3/1966 | Albert | 200/61.45 |
| 3,233,464 | 2/1966 | Mol | 73/503 X |

Primary Examiner—James J. Gill
Attorney—S. A. Giarratana and Thomas W. Kennedy

[57] ABSTRACT

An accelerometer having a plurality of proof masses adapted to move relative to a casing in response to accelerations of the casing. The proof masses differ with respect to mass or size so that they respond differently to forces thereon as a result of the acceleration. An output signal is generated in response to a predetermined movement of each of the proof masses.

11 Claims, 2 Drawing Figures

PATENTED NOV 13 1973  3,771,368

INVENTOR
WILLIAM C. ALBERT

BY *S. A. Giovacatore*
*Thomas W. Kennedy*
ATTORNEYS 3,771,368

MULTI-OUTPUT INTEGRATING ACCELEROMETER

BACKGROUND OF THE INVENTION

This invention relates to an accelerometer, and more particularly, to an accelerometer adapted for multiple outputs.

In U.S. Pat. No. 3,239,620, issued on Mar. 8, 1966 to the same inventor and assigned to the same assignee as the present invention, a velocity switch is disclosed in which a single proof mass moves relative to a casing in response to accelerations of the casing to perform a time integration of acceleration. Upon a predetermined displacement of the proof mass from its initial position, it comes into contact with a switch so that the acceleration integration at that instant can be ascertained.

However, this type of device is limited to a single output, that is, the contact of the proof mass with the switch can only provide an indication that one predetermined acceleration integration value has been reached. It is therefore apparent that this type of device has limited applications.

SUMMARY OF THE INVENTION

It is an object of the present invention to provide an accelerometer for providing multiple time integrals of acceleration as well as multiple outputs.

Towards the fulfillment of this object, the accelerometer of the present invention comprises a casing having a plurality of passages defined therein, a proof mass disposed in each of said passages, each proof mass adapted to move in its respective passage relative to said casing in response to a predetermined acceleration of said casing, and means responsive to a predetermined movement of each of said proof masses for generating an output.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
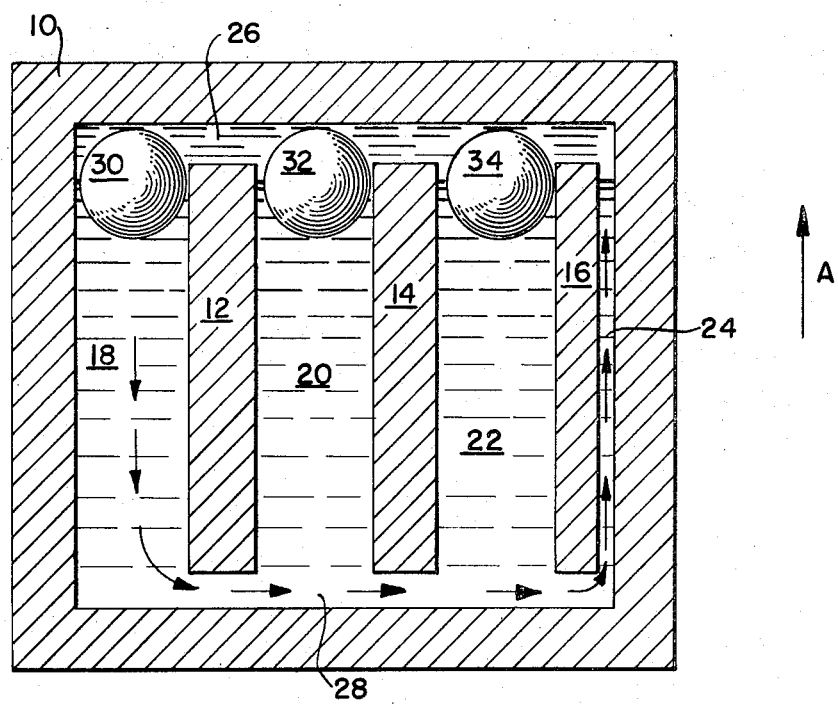
FIG. 1 is a diagrammatic view illustrating the operational theory of the accelerometer of the present invention.

The basic operational theory of the accelerometer of the present invention is better explained with reference to FIG. 1, in which the reference numeral 10 refers to a casing having three partitions 12, 14, and 16 formed therein which divide the casing into a plurality of passages 18, 20, 22, and 24 extending in a vertical direction, as viewed in FIG. 1. A pair of horizontal passages 26 and 28 are also formed which extend in a horizontal direction and communicate with each of the passages 18, 20, 22, and 24.

Although the partitions 12, 14, and 16 are shown as simple wall-like members in FIG. 1 for convenience of presentation, it is understood that the configuration and spacing of the partitions are such that the passages 18, 20, and 22 are in the form of cylindrical bores. This can be easily achieved by spacing the passages with respect to a plane perpendicular to the plane of FIG. 1 and forming the partitions accordingly, for example.

A plurality of proof masses 30, 32, and 34, each in the form of a spheroid, are disposed in the passages 18, 20, and 22, respectively. The diameter of each of the proof masses 30, 32, and 34 is substantially equal to, but slightly less than, the cross-sectional diameter of their respective bores 18, 20, and 22, respectively.

A damping medium, preferably in the form of a viscous fluid, is disposed in the casing and in each of the passages 18, 20, 22, and 24. The cross-sectional area of the passage 24 is less than that of the passages 18, 20, and 22, so that passage 24 provides a restriction to flow of the fluid.

The proof masses 30, 32, and 34 are shown in their inoperative position in FIG. 1, that is, in the upper portion of the casing 10. As will be explained in greater detail in the embodiment following, means are provided to normally bias the proof masses in this position until a predetermined acceleration of the casing 10 is obtained.

For the purposes of this example, it is understood that the proof masses 30, 32, and 34 are formed of different materials so that the proof mass 30 has a greater mass than proof mass 32, and that the latter has a greater mass than proof mass 34. In this manner, the proof masses will respond differently to accelerations of the casing in the direction indicated by the arrow "A" in FIG. 1 as a result of different forces acting thereon, each force being due to the product of the mass of the particular proof mass times the acceleration.

The device begins operation upon a predetermined acceleration being attained by the casing 10 of a magnitude that exceeds the biasing force on the proof masses 30, 32, and 34. As the acceleration increases, the proof mass 30 will be first to respond to the force thereon as a result of the product of mass times acceleration, since it has the greatest mass. Thus it will initially move in the passage 18 and perform an input acceleration integration. In this movement, the proof mass 30 will displace fluid through the passage 18 the restricted passage 24, and back into the passage 26. This will create a differential fluid pressure and a resulting force equal to the product of the fluid pressure differential times the cross-sectional area of the proof mass 30 across the passage 18. This latter force is equal in magnitude to the force as a result of the mass of the proof mass 30 times the acceleration, but greater than the force as a result of the mass of the proof mass 32 times the acceleration, and greater than the force as a result of the mass of the proof mass 34 times the acceleration. Since the force equal to the fluid pressure differential across the proof mass 30 times the cross-sectional area of the proof mass 30 acts in a direction opposite to the direction of the force as a result of the mass of the proof mass 32 times the acceleration, and the mass of the proof mass 34 times the acceleration, the proof masses 32 and 34 will remain in the position shown in FIG. 1 until the proof mass 30 comes to a stop as a result of its engaging the inner wall of the casing 10 at the lower portion of the passage 18. This relieves the pressure differential across the proof mass 30 and the above-mentioned forces against the proof masses 32 and 34.

Since the proof mass 32 has a greater mass than the proof mass 34, the proof mass 32 will immediately begin its downward movement, creating a force acting on the proof mass 34 equal to the product of the fluid pressure differential across the proof mass 32 and the cross-sectional area of the proof mass 32. For the same reasons described above the latter force will maintain the proof mass 34 in the position shown in FIG. 1 until the proof mass 32 comes to a stop as a result of its engaging the inner wall of the casing 10, at which time the proof mass 34 will begin its movement. As a result, sequential input acceleration integrations are achieved.

The above flow of fluid through the passage 24 aids in damping the above movement of the proof masses 30, 32, and 34 to an extent that the movement, and therefore the integrations, can be controlled to a precise degree.

If a contact switch, or other similar device, is provided in the lower portion of each of the passages 18, 20, and 22, they will be contacted by the proof masses 30, 32, and 34, respectively, upon a predetermined acceleration integration of a casing 10 being attained, thus enabling corresponding outputs to be produced.

As emphasized above, the forces acting on the proof masses 30, 32, and 34 as a result of the casing accelerations are not only directly proportional to the mass of the respective proof mass, but are proportional to the cross-sectional areas of the proof masses. Therefore, if the cross-sectional areas of the proof masses were varied, the proof masses would respond differently to different accelerations, despite the fact that they have equal masses. For the purposes of illustrating this operation, the proof masses of the preferred embodiment of FIG. 2 are shown to be of a different size, and are assumed to have substantially the same mass.

Figure 2:
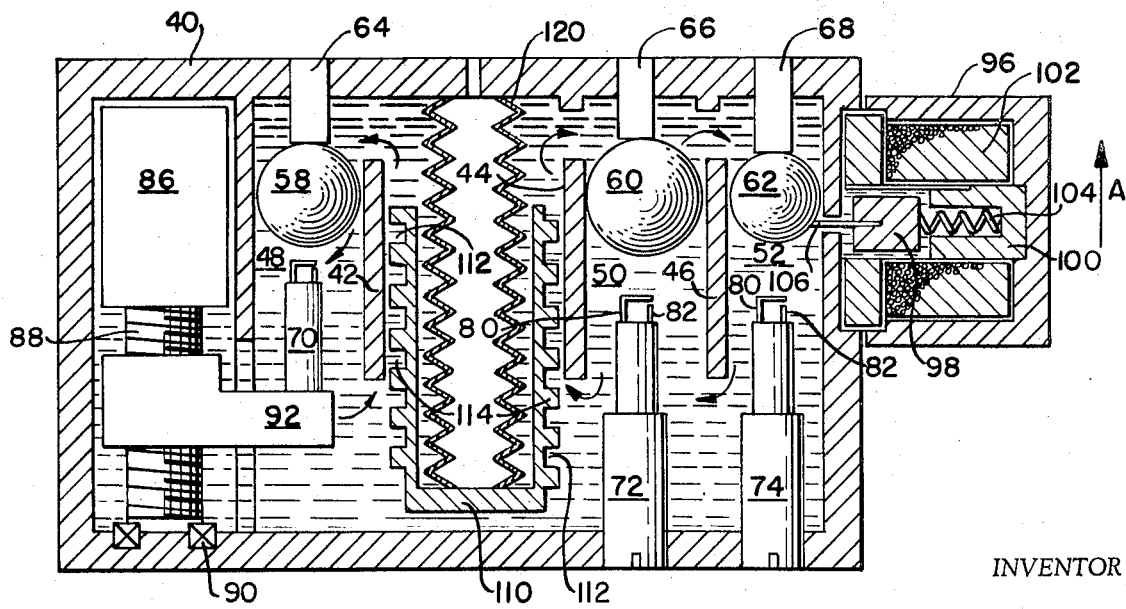
FIG. 2 is a vertical cross-sectional view of a preferred embodiment of the accelerometer of the present invention.

Referring specifically to FIG. 2, a casing 40 is provided having a plurality of partitions 42, 44, and 46 formed therein to define three passages 48, 50, and 52. The vertical lengths of the partitions 42, 44, and 46 are less than the vertical size of the casing 40 as viewed in FIG. 2, so that the passages 48, 50, and 52 communicate with one another both at their upper ends and at their lower ends, as shown.

Proof masses 58, 60, and 62 are provided in the passages 48, 50, and 52, respectively. Each proof mass is in the form of a spheroid, with the size of the proof mass 62 being less than that of the proof mass 58, and the size of the proof mass 58 being less than that of the proof mass 60. As in the previous illustration, the configuration and spacing of the partitions 42, 44, and 46 along with the corresponding portions of the casing 40 are such that the passages 48, 50, and 52 are in the form of cylindrical bores, with the cross-sectional area of each bore being substantially equal to, or slightly greater than, the cross-sectional area of its corresponding proof mass.

A plurality of biasing members 64, 66, and 68 extend in the upper wall of the casing 40 and project into the passages 48, 50, and 52, respectively. The biasing members 64, 66, and 68 are adapted to engage the proof masses 58, 60, and 62 to retain them in their nonoperative positions as shown in FIG. 2 until a predetermined casing correlation is attained. Preferably, the biasing members are in the form of permanent magnets, and the proof masses of a material that is attracted thereto.

Three contact devices 70, 72, and 74 are positioned in the passages 48, 50, and 52 and are normally spaced from the proof masses 58, 60, and 62, respectively, in the inoperative position of the latter. As shown by way of example in connection with the contact device 74, each device includes a movable L-shaped contact member 80 and a fixed contact member 82 normally spaced therefrom. Upon being engaged by the downwardly moving proofmass 62, the contact member 80 is adapted to move towards the member 82 and contact same. Since these contact devices 70, 72, and 74 are of a conventional design, they will not be described in any further detail, it being sufficient to say that they can be electrically connected in a circuit that will be completed upon contact of the contact members 80 and 82 to provide an output corresponding to the acceleration.

An apparatus for positioning the contact device 70 in the casing 40 is provided, and includes a drive member 86 disposed in the casing and adapted to rotate a lead screw 88 which is mounted relative to the casing by a bearing assembly 90. A carriage 92, having an internally threaded bore (not shown) in threaded engagement with the lead screw 88, is adapted for vertical movement relative to the casing 40 in response to rotation of the lead screw.

The contact device 70 is mounted on the carriage so that the former may be precisely located a predetermined distance from the proof mass 58 in the inoperative position of the latter. It is understood that the drive member 86 may include a gear system for drivingly connecting an energy source, such as a stepper motor, to the lead screw 88 and also may include a pick-off to determine the exact position of the lead screw and therefore the carriage 92.

Although not shown in FIG. 2 for convenience of presentation, it is understood that the contact devices 72 and 74 may also be adjusted in their respective passages by means of a positioning apparatus identical to the apparatus described immediately above.

A device for latching the proof masses in their inoperative positions is shown in connection with the proof mass 62 in FIG. 2. In particular, this device includes a housing 96 mounted on the casing 40 and having a solenoid operated latch member 98 supported therein. The solenoid action is obtained by a core 100 disposed within the housing 96 and surrounded by a coil 102, with a spring 104 normally urging the latch member 98 in a direction away from the core. An energizing current input applied to the coil 102 will create a force which will overcome the bias of the spring 104 and cause the latch member 98 to move towards the core 100, in a conventional manner.

A latch plate 106 extends outwardly from the latch member 98 and is adapted to engage the proof mass 62 to lock the proof mass with respect to its magnet 68 during inoperation of the device. As in the case of the positioning apparatus, the latch device is shown in connection with the proof mass 62 only for convenience of presentation, it being understood that a similar device can also be associated with the proof masses 58 and 60, in which case the proof masses 58, 60, and 62 can be maintained in their inoperative positions during transportation or handling of the accelerometer, or when it is desired to prevent any unnecessary use thereof.

The casing 40 contains a damping medium, preferably in the form of a viscous fluid. A restricted flow passage for the fluid is provided by means of a hollow cylindrical member 110 disposed in the casing 40 and having a continuous helical groove 112 formed in the outer surface thereof. This groove cooperates with the partitions 42 and 44, respectively, to define a restricted passage 114 therebetween which corresponds in function to the passage 24 discussed in connection with FIG. 1.

Since the damping coefficient on the proof mass is directly proportional to the viscosity of the fluid times the length of its flow path, it can be appreciated that compensation must be made for changes in the viscosity of the fluid due to temperature variations in order to maintain a substantially constant damping coefficient. In order to achieve this, the cylindrical member 110 is fixed relative to one end of a bellows 120 which is attached at its other end to the inner wall of the casing 40. In this manner, expansion or contraction of the bellows in response to corresponding changes in the volume of the fluid in the casing 40 due to temperature variations, will cause a corresponding movement of the cylindrical member 110 and a change in the length of the effective flow path 114. As a result, a substantially constant damping coefficient for the fluid is maintained.

In operation, and assuming an acceleration of the casing 40 in a direction indicated by the arrow "A," the biasing members 64, 66, and 68 normally maintain the proof masses 58, 60, and 62 in their inoperative positions as shown in FIG. 2 until the casing attains a predetermined minimum acceleration. Assuming the biasing forces established by the magnets 64, 66, and 68 are equal, and that the masses of the proof masses 58, 60, and 62 are equal, the only different forces acting on the latter will be the forces caused by the pressure of the damping fluid in the casing 40 acting on each proof mass. Since the proof mass 62 has a smaller cross-sectional area across the width of its passage 52 than the proof masses 58 and 60, the above force is less with respect to the proof mass 62 than with respect to the proof masses 58 and 60. As a result, the proof mass 62 will be the first to move downwardly in the casing in response to increasing accelerations of the casing. This movement of the proof mass 62 will continue until it contacts the contact member 80 of the contact device 74, and forces same into contact with the contact member 82 and thus completes a circuit that will give an output in response to the accelerations of the casing 40 at that instant. During the movement of the proof mass 62, a force acting on the proof masses 58 and 60 will be created which is equal to the differential fluid pressure across the proof mass 62 times the cross-sectional area of the proof masses 58 and 60, and which is sufficient to maintain the proof masses 58 and 60 in contact with the biasing members 64 and 66, respectively. Upon contact of the proof mass 62 with the contact device 74, this force is relieved and, since the proof mass 58 has a cross-sectional area less than that of the proof mass 60, the proof mass 58 will begin its movement.

For the same reasons as discussed, the proof mass 60 will begin its movement upon the proof mass 58 contacting the contact device 70.

It can be appreciated that the system of FIG. 2 thus provides sequential acceleration integrations, as in the example of FIG. 1.

It is understood that the optical pick-off associated with the drive member 86 and discussed briefly above, can provide output pulses which, when counted, give an indication of the position of the carriage 92. In this context, the contact devices 70, 72, and 74, along with the pick-off and the necessary associated electronics, can be adapted to form a high-resolution, digital-positioning servosystem.

It is also understood that an internal fluid leakage will occur past each proof mass due to the fact that the diameter of each proof mass 58, 60, and 62 must be slightly less than the width of its respective passage. However, since the leakage occurs past each proof mass, it can be neglected or, if desired, compensated for.

Of course, under actual practice, proof masses of the same material and of a different size will have a different mass. Therefore, both of the above-mentioned forces will be applied to the proof masses, i.e., the force as a result of the mass of the proof mass times the acceleration, and the force of the proof mass as a result of differential pressure across the proof mass times its cross-sectional area. It is apparent from the foregoing that the accelerometer of the present invention is easily adaptable to these multiple parameters.

Variations may be made in the foregoing without departing from the scope of the invention. For example, although three proof masses are shown by means of example, it can be appreciated that any number of proof masses can be provided.

Of course, other variations of the specific construction and arrangement of the accelerometer disclosed above can be made by those skilled in the art without departing from the invention as defined in the appended claims.

I claim:

1. An accelerometer comprising a casing having a plurality of elongate proof mass passages and a plurality of interconnecting passages defined therein, a proof mass disposed in each of said proof mass passages, each proof mass adapted to move in its respective proof mass passage relative to said casing in response to a predetermined acceleration of said casing, and means responsive to a predetermined movement of each of said proof masses for generating an output, wherein said proof mass passages communicate with one another through said interconnecting passages, and wherein said interconnecting passages include an inlet passage connecting to one end of each said proof mass passage on one side of its said proof mass, an outlet passage connecting to an opposite end of each said proof mass passage on the opposite side of its said proof mass, a connecting passage interconnecting said inlet passage to said outlet passage, and wherein each said proof mass has a selective mass and size arranged to provide a sequential actuation of said proof masses, and wherein damping means in the form of a fluid is disposed in said casing and said passages.

2. The accelerometer of claim 1 wherein each of said proof masses has a different cross-sectional area so that the pressure of said damping fluid applies different forces to each of said proof masses.

3. The accelerometer of claim 2 wherein each of said proof masses has a different mass, so that they respond differently to forces thereon as a result of a predetermined range of accelerations.

4. The accelerometer of claim 1 wherein movement of each proof mass relative to said casing causes a corresponding flow of said damping fluid, and further comprising means in said casing for establishing a restricted flow path for said damping fluid.

5. The accelerometer of claim 1 further comprising means disposed in said casing for compensating for changes in the viscosity of said damping fluid in response to temperature variations.

6. The accelerometer of claim 4 further comprising means disposed in said casing for compensating for changes in the viscosity of said damping fluid in response to temperature variations.

7. The accelerometer of claim 6 wherein said compensating means comprises a bellows disposed in said casing and adapted to expand and contract in response to changes in volume of said damping fluid due to temperature variations, and further comprising means to vary the length of said restricted flow path in response to movement of said bellows.

8. The accelerometer of claim 7 wherein said means for establishing said restricted flow path comprises means connected to said bellows and adapted to define a helical flow path in said casing, whereby movement of said bellows varies the effective length of said flow path.

9. The accelerometer of claim 1 wherein said means for generating an output comprises contact means in the path of each of said proof masses and spaced a predetermined distance therefrom, and means to vary said predetermined distance.

10. The accelerometer of claim 1 further comprising means to apply a predetermined bias force to each of said proof masses to prevent any movement thereof in the absence of a predetermined casing acceleration.

11. The accelerometer of claim 1 further comprising means to latch each of said proof masses into a position in contact with said biasing means, and means to release said latch.

* * * * *